United States Patent
Roeder

[15] 3,653,045
[45] Mar. 28, 1972

[54] RADIOMETER MODULATOR-DEMODULATOR SYSTEM
[72] Inventor: Robert S. Roeder, Dunedin, Fla.
[73] Assignee: Sperry Rand Corporation, Great Neck, N.Y.
[22] Filed: June 3, 1970
[21] Appl. No.: 43,055

[52] U.S. Cl. ..........................343/100 ME, 73/355, 324/95, 325/363
[51] Int. Cl. .....................................................G01k 11/00
[58] Field of Search ..............343/100 ME; 324/95; 325/393; 73/355

[56] References Cited

UNITED STATES PATENTS 3,204,240  8/1965  McKay et al.....................343/100 ME
3,475,963  11/1969  Astheimer............................73/355 R

*Primary Examiner*—Rodney D. Bennett, Jr.
*Assistant Examiner*—Richard E. Berger
*Attorney*—S. C. Yeaton

[57] ABSTRACT

An improved microwave radiometer of the comparison type features simplified construction through the employment of a unitary modulator-demodulator system operating on the high frequency signal to be investigated by cyclically sampling and exposing the signal to be investigated and a reference signal to synchronous demodulation by a demodulator element constructed integrally with the high frequency sampling switch or chopper.

8 Claims, 5 Drawing Figures

PATENTED MAR 28 1972

INVENTOR
ROBERT S. ROEDER
BY
*H.P. Terry*
ATTORNEY

INVENTOR
ROBERT S. ROEDER
BY
*H.P. Terry*
ATTORNEY 3,653,045

RADIOMETER MODULATOR-DEMODULATOR SYSTEM

BACKGROUND OF THE INVENTION

1. Field of the Invention

The invention pertains to the art of microwave radiometry using comparison of the amplitude of a signal to be investigated, such as a thermal noise signal, to the amplitude of a locally generated reference signal. In this type of radiometer, an amplitude detector or demodulator circuit is connected alternately through a receiver system first to an antenna and then to a local reference signal generator.

2. Description of the Prior Art

Radiometric measurements employing high frequency receiver systems known as comparison radiometers have been most widely made for the examination of relatively low-level noise-like radio frequency signals, especially where the noise signals to be examined are often small in comparison to noise internally generated within the radiometer receiver. Comparison radiometer systems effect substantial cancellation of the receiver background noise and self-noise, permitting relatively accurate measurements of such low-level radio frequency input signals.

While there are several types of comparison radiometers, a type particularly used in the microwave region is the classic Dicke radiometer. The method employed therein lies essentially in the cyclic comparison of an unknown noise signal amplitude coming from a source to be examined with a noise signal from a local calibrated source. In this instrument, the receiver input is cyclically switched between the antenna and the local reference signal source at a moderate audio rate, and the detected and amplified receiver output is coupled to a phase detector or demodulator circuit operating in synchronism with the switching rate. The final unidirectional output signal from such a radiometer is proportional to the difference between the temperature of the reference signal source and the temperature of the source viewed by the antenna, since the phase detector or demodulator acts automatically to subtract the background or internal noise of the receiver.

While prior art radiometers of the Dicke type and generally those of the comparison type have certain advantages, they also have certain clear disadvantages. Serious disadvantages include relatively high cost and weight, complexity, and considerable power demand. In low information rate radiometers, a simple rotating motor-driven card wave-guide switch or chopper is preferably employed for cyclically sampling the signal to be examined and the temperature reference signal. For the ultimate phase sensitive demodulation of the chopped or sampled signals, a reference voltage wave is often derived from an alternating current generator driven by the chopper motor. Generally, it is necessary to re-shape and amplify this reference wave before application to the phase sensing demodulator. The requirement of phase coherence at the phase sensitive demodulator generally injects a need for circuits permitting phase adjustment at least over a moderate range to account for phase shifts in the receiver. Continuous phase control over an extensive range is not readily achieved. Good phase stability of the phase sensitive demodulator with temperature variation is also a requirement in order to maintain phase coherence. Such requirements lead to complexity of design and to excessive cost.

Conventional semiconductor, electromechanical, or vacuum tube phase demodulation circuits, though long-lived, also represent items of considerable initial expense and are circuits which add significantly to power supply capability requirements. Conventional semiconductor phase sensing demodulator circuits also present problems of off-set voltage, drift, and contact resistance; isolation and noise problems are also often serious.

SUMMARY OF THE INVENTION

The present invention is a unitary modulator-demodulator system for cyclically sampling radiometric high frequency or microwave unknown and reference signals and for providing a synchronous demodulation of the detected signals for comparison or measurement purposes. The invention is an essential element for use in low cost electromagnetic energy radiometers providing means for detecting and measuring very weak electromagnetic signals, including electrical noise signals of the thermal noise level type. The cyclic sampling function is performed by a motor-driven switch or chopper element in which a noise reference element of a known temperature is physically cyclically injected into and withdrawn from a transmission line joining a receiving antenna to the radiometer receiver. The output of the detector of the radiometer receiver is an audio signal having a strong audio component at the same audio frequency as the frequency at which the microwave chopper is operated. The audio is applied through a narrow-band audio amplifier to a phase sensitive detector, thence through a low pass filter and DC amplifier to a zero center DC meter. The phase sensitive detector or demodulator of the invention is a simple electromechanical element mounted directly in unitary fashion upon the chopper element and is driven in synchronism therewith by the chopper motor.

DESCRIPTION OF THE PREFERRED EMBODIMENT

Figure 1:
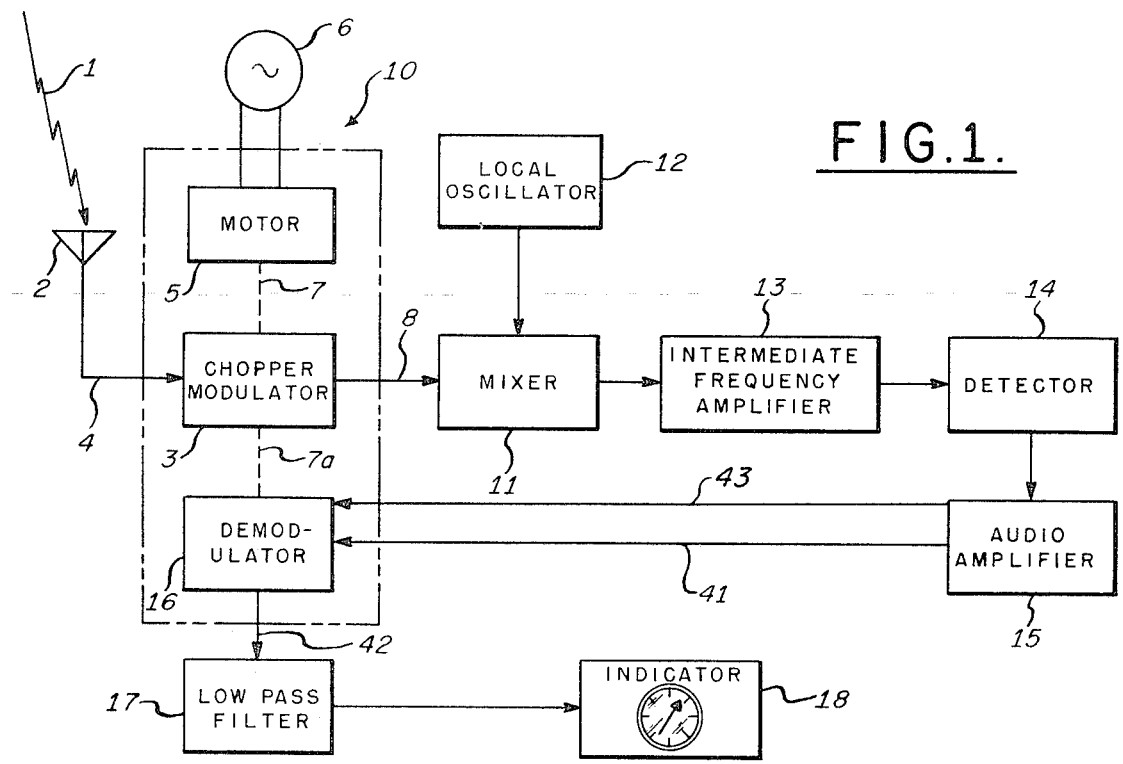
FIG. 1 is a block diagram of a radiometric receiver system for employment of the unitary modulator-demodulator system of the present invention.

FIG. 1 shows in block diagram form a radiometer apparatus for employment of the novel modulator-demodulator system. While the radiometric system is illustrated in block diagram form, it will be seen that the invention is useful over a wide spectrum of radio frequencies, and that it is of particular interest for use in the high frequency or microwave bands, including those of the ultra high frequency region or higher. It will be understood that the invention is useful in the type of radiometer known in the art as the comparison radiometer. In the comparison radiometer, the radiometer receiver is cyclically and alternately switched from a receiving antenna to a reference noise source.

The invention will be discussed herein in operation in a type of comparison radiometer receiver in which a mechanically actuated microwave switch or chopper first connects incoming signals collected by an antenna to the radio receiver, and then in effect connects instead a temperature controlled microwave noise source to the receiver. Cyclic repetition of this switching or chopping process is conventionally employed in certain prior art radiometers. The invention is applicable in the classical microwave type of comparison radiometer in which a noise reference element of known temperature is physically and cyclically injected into and withdrawn from the transmission line joining the receiving antenna to the radiometer receiver.

In FIG. 1, signals 1 such as, for instance, low-power, noise-like radio frequency signals commonly associated with thermal radiation, generated by any source to be examined by the radiometer, are received by an antenna 2 which may be any of various known types of board band microwave or other antennas previously used in the radiometer art. The antenna accepts all signals falling within its pass band and supplies them to an input 4 of a high frequency switching or chopping device 3. As will be seen in greater detail from the discussion to follow of FIGS. 2,3, and 4, modulator or chopper 3 is driven via drive shaft 7 by an electric drive motor 5 powered from a suitable electric power source 6. The chopping or switching device 3 is a microwave element that functions cyclically and alternately to connect antenna 2 or an internally contained reference noise signal source to the input 8 of the remaining elements of the radiometer receiver.

Transmission line 8 supplies the cyclically varying signal propagating with it to a conventional microwave mixer 11. A local oscillator 12, supplying high frequency signals in the usual manner to mixer 11, causes mixing of the two input signals, generating a modulated difference frequency signal in the intermediate frequency spectrum for application to broad band intermediate frequency amplifier 13.

The output of intermediate frequency amplifier 13, when there is a cyclic variation in the signal propagating in line 8, is an amplitude modulated noise signal, the modulation frequency being the switching repetition rate of chopper 3. Envelope detector 14 is used in the conventional manner to abstract this audio modulation, which may be of a frequency on the order of 30 cycles per second, from the intermediate frequency envelope, and to pass it through tuned or narrow band audio amplifier 15. Amplifier 15 has the center of its pass band substantially coincident with the switching frequency of chopper 3.

In order to determine if the noise signals collected by antenna 1 are greater or lesser in magnitude than the noise signals generated internally by modulator or chopper 3, and how much the amplitudes differ, the output of audio amplifier 15 is supplied to electromechanical demodulator 16. As will be seen in greater detail in connection with FIGS. 2,3,4, and 5, demodulator 16 is driven by motor 5 via drive shaft 7a in synchronism with the operation of chopper 3, so that demodulator 16 operates on the output of amplifier 15 as a synchronous demodulator. It will be seen that motor 5, chopper 3, and demodulator 16 form elements of the novel unitary modulator-demodulator 10 featured as a novel aspect of the present invention.

The output of phase sensitive detector or demodulator 16 is a polarity reversing direct voltage, which signal is subjected to the action of a low pass filter or integrator 17, and is finally displayed for instance, by a zero-center direct current meter 18. The relative phase adjustment of modulator or chopper 3 and demodulator 16 is such that, when signal 1 is equal in amplitude to the reference noise signal from the reference source internal of chopper 3, the meter needle points to zero, for instance, on the scale of meter 18. When signal 1 differs in amplitude with respect to the reference noise signal, the needle is directed proportionally to one side or to the other of the zero indication of meter 18, for example.

Figure 2:
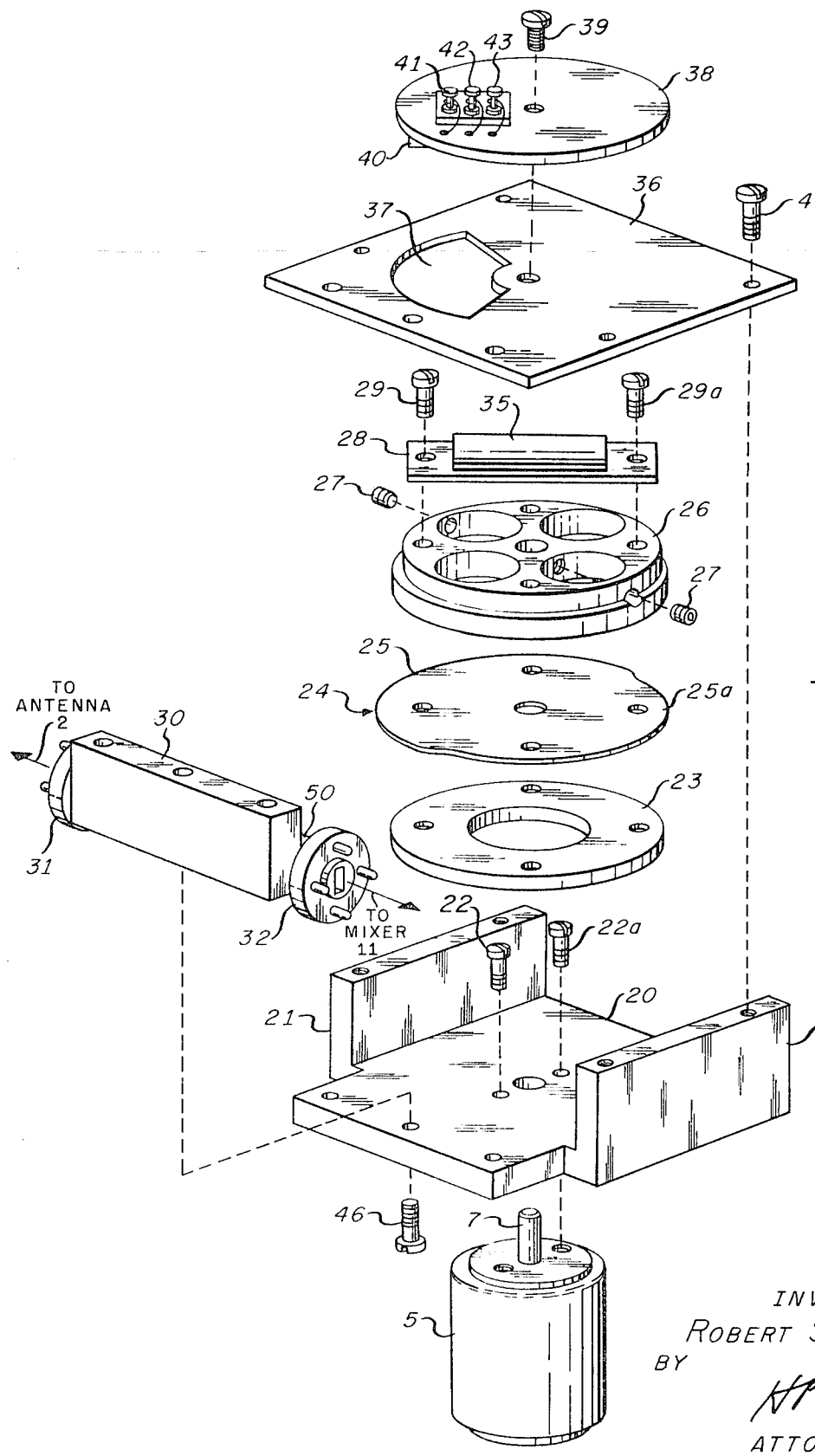
FIG. 2 is a simplified exploded view of the novel modulator-demodulator system of FIG. 1.
Figure 3:
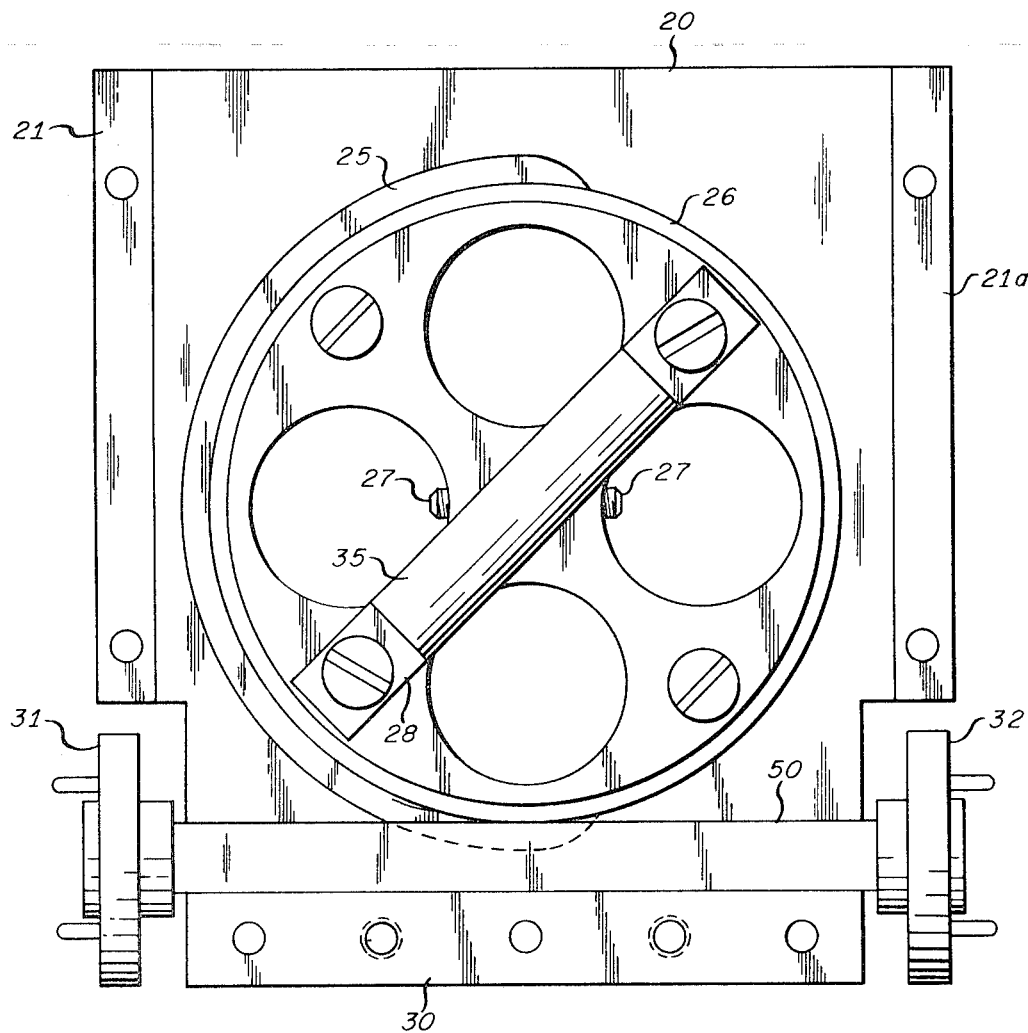
FIG. 3 is a plan view of the device of FIG. 2 with upper-most parts removed.
Figure 4:
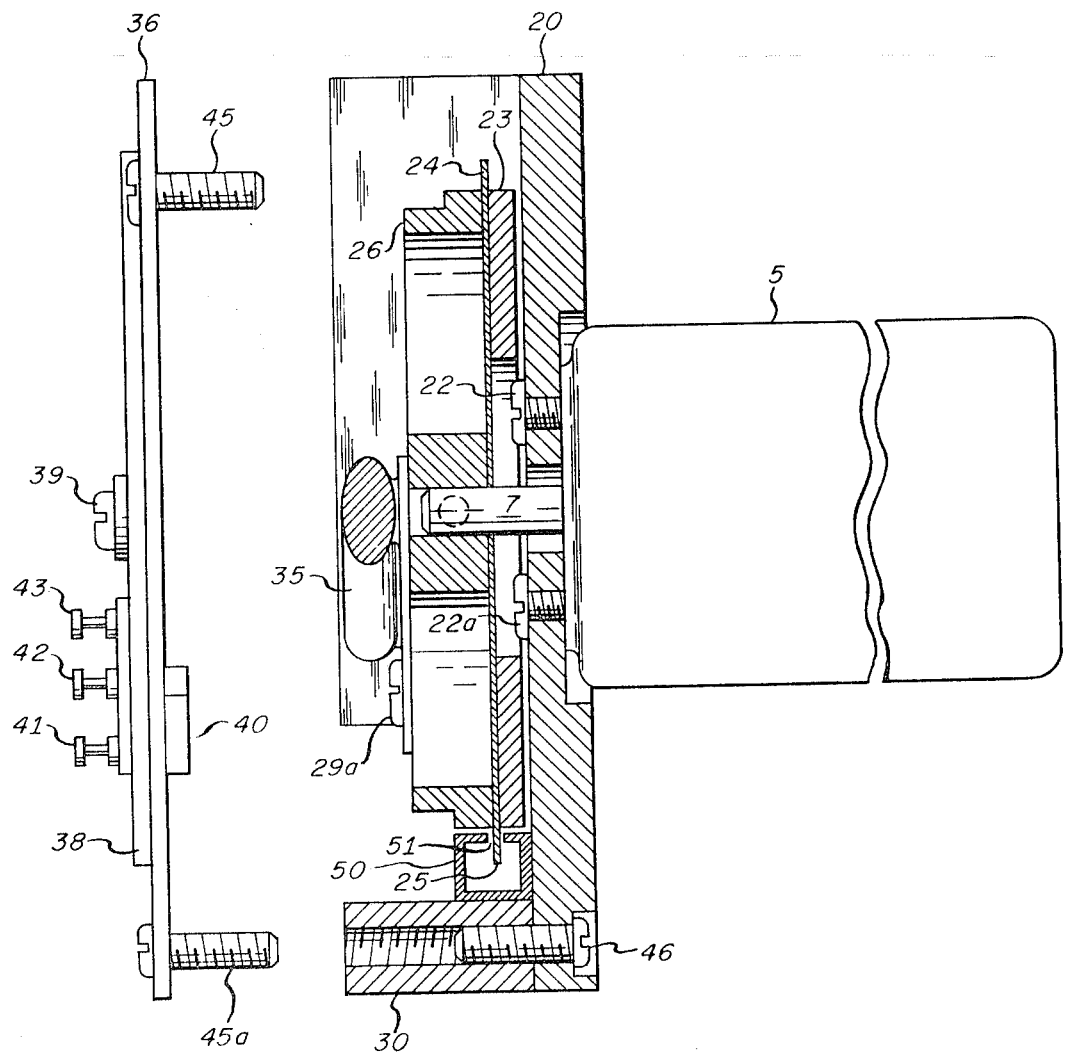
FIG. 4 is a side view of the device of FIG. 2 partly in cross section.

As noted above, a novel feature of the invention is the unitary modulator-demodulator device 10 of FIG. 1; its novel structure and operation will be made apparent by reference to FIGS. 2 to 5. Referring particularly to FIGS. 2,3, and 4, the device 10 is driven by a hysteresis synchronous electric motor 5 attached to a base plate 20 by screws 22, 22a so that the motor drive shaft 7 passes freely through plate 20. The base plate 20 is equipped with parallel side walls 21, 21a for the support of elements yet to be described.

Shaft 7 has fastened to it a composite rotor element responsible for cooperatively aiding in both the modulation or chopping and demodulation functions. The composite rotor is made up of a low inertia spoked wheel 26 fastened by set screw 27 to shaft 7. Wheel 26 furthermore acts as a clamping disc in cooperation with apertured clamping ring 23 to form outer sandwich layers, one on each side of chopper disc 24. Elements 23, 24, and 26 are conveniently fastened in unitary fashion, as by screws 29, 29a.

Disc 24 is provided with a surface of a material which actively absorbs microwave energy; since it may act as an absorber of such energy, it may also beneficially serve as a radiator of such energy. A sheet of material such as mica of about 0.003 inches thickness coated on both sides by vacuum evaporation with chromium or a like metal so as to present a resistivity on the order of 400 ohms per square is found to be suitable for disc 24.

Mounted at right angles to walls 21, 21a is a wall 30 fastened to base plate 20 as by screw 46. Wall 30 integrally supports rectangular wave guide 50 which, as best seen in FIG. 4, has a narrow longitudinal slot 51 at the mid-point of its broad wall.

The longitudinal axis of slot 51 in wave guide 50 is arranged to be co-planar with the modulator or chopper disc 24 so that a part of disc 24 may be extended through slot 51 into guide 50. Disc 24 is cam shaped, having a periphery made up in two substantially 180° extensive sectors 25 and 25a. As is seen in FIGS. 2 and 3, sector 25 has a slightly larger diameter than sector 25a, and is therefore capable of extending well into the interior of guide 50, while sector 25a lacks that capability.

In operation, as motor 5 rotates, the resistive surfaces of disc 24 are rotated at, for instance, 1,800 revolutions per minute for a power source 6 frequency of 60 cycles per second. One revolution of shaft 7 therefore produces one cycle of modulation or chopping within guide 50. Such is attained because of the cam shaped nature of disc 24.

In actual usage, wave guide 50 is connected by flange 31 through transmission line 4 (FIG. 1) to antenna 2, and guide 50 is similarly connected by flange 32 through transmission line 8 to mixer 11. When sector 25a of disc 24 is adjacent slot 51, any signals collected by antenna 2 are free to pass to mixer 11 with substantially no attenuation. However, when sector 25 of disc 24 is adjacent slot 51, sector 25 extends into the interior of guide 50 parallel to the electric field of the wave which would propagate in guide 50. In this circumstance, any signals received by antenna 2 are absorbed by the resistive layer or layers on chopper or modulator disc 25. At the same time since the resistive disc 24 has an effective noise radiation temperature, it radiates a corresponding reference or standard noise energy level into guide 50 and consequently into mixer 11. The cycle repeats at a modulation or chopping rate of 30 cycles per second when motor 5 is driven as above-specified.

FIGS. 2, 3, 4, and 5 serve as aids in discussing the structure and operation of the signal demodulator portion of the inventive modulator-demodulator device. As seen in these figures, a bar magnet is placed symmetrically and diametrically on top of wheel 26; magnet 35 is cemented to a rectangular plate 28 and the plate 28 is fastened on top of wheel 26 by the same screws 29, 29a as are used to clamp wheel 26 modulator or chopper disc 25, and ring clamp 23 together in unitary fashion.

A cover plate 36 is fastened over the rotary system including magnet 35 by screws, such as screw 45, to the upright walls 21, 21a which are integral with base plate 20. Cover plate 36 supports an adjustable switch assembly plate 38, plate 38 being adjustably fastened to cover plate 36 by a screw 39 which may be loosened to facilitate the relative adjustment of the angular position of plate 38 with respect to cover plate 36, and thus with respect to chopper disc 24.

Figure 5:
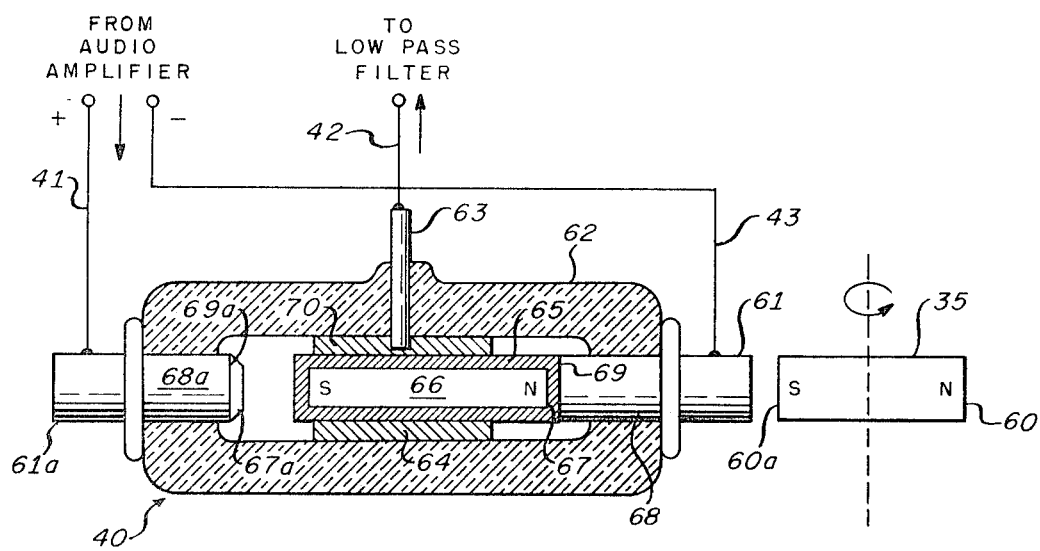
FIG. 5 is a view, partly in cross section, of a component of the apparatus of FIG. 2.

Plate 38 supports a single pole, double throw switch 40 on its lower surface end to end with magnet 35 for actuation thereby. Switch 40 is aligned radially with respect to adjustment screw 39 and its location is substantially as illustrated in FIG. 5. FIG. 5 illustrates switch 40 on an exaggerated scale relative to that of magnet 35, but it is seen that switch 40 is placed end to end with the circular locus described by the ends of bar magnet 35 as the latter is rotated. Switch 40, being of the single pole double throw type, is supplied with electrical terminals or leads 41, 42, and 43. As is best understood by reference to FIG. 2, cover plate 36 is equipped with an arcuate cut-out portion 37 whose radii center upon screw 39. Switch 40 extends through the cut-out portion 37 in proximate relation to the plane of magnet 35, so that it may be readily actuated by the opposite poles of magnet 40 as they pass the end of it. If switch assembly plate 38 is free to be manually rotated, the angular position of switch 40 relative to cover plate 36 is adjustable over the angular spread fixed by the angular dimension of cut out portion 37. For example, phase adjustment of the demodulator relative to the modulator or chopper 3 is accomplished by manually rotating switch assembly plate 38 until the demodulated output signal is a maximum. After adjustment, screw 39 is re-tightened. If quadrature pick off signals are desired, more than one switch such as switch 40 may be operated in common by magnet 35.

Switch 40 is shown in further detail in FIG. 5 to be a small bi-stable mercury film switch of the break-before-make type. It comprises a hermetically sealed insulating capsule 62 with electrodes 61 and 61a sealed in axial relation within the capsule 62 to provide opposed inner contacting surfaces 69,69a. Contact surfaces 69,69a are wetted by mercury, as at 47,67a.

A small cylindrical armature magnet 66 lies on the axis of the switch structure between contacts 69,69a. This second magnet element is supported within a cylindrical tube 70, supported fixedly, in turn, by the inner cylindrical wall of capsule 62. A thin film 65 of mercury wets the inner wall of tube 70 and also the cylindrical wall of magnet 66, providing an interfacial surface upon which magnet 66 readily glides within tube 70.

In the illustration, it is seen that the south pole S of rotating magnet 35 is instantaneously end to end with contact surface 69 and that it has caused the north pole N of armature magnet 66 to move toward the right end of switch 40. Since the ends of the armature magnet 66 are wetted by mercury, as well as its sides, a very low resistance electrical path is found including electrode 61, the contacting mercury film 67, the cylindrical mercury film 65, tube 70, and lead wire 63 which is attached to tube 70 and is passed in hermetically sealed fashion through the wall of capsule 62. Contact resistances as low as 50 milliohms are regularly demonstrated in such switches. It is easily seen from FIG. 5 that, when magnet 35 is rotated by 180°, the north pole N of magnet 35 will be end to end with surface 69. Then, the armature magnet 66 will be driven to the left end of switch 40. The above described electrical surface will be broken and a new low resistance circuit will be completed through electrode 61a, the contacting mercury film 67a, the cylindrical mercury film 65, tube 70, and lead wire 63. As magnet 35 rotates, it provides a rotating magnetic field that actuates switch 40. The switch 40 is actuated by one pole of magnet 35 and remains in the corresponding actuated position until the opposite pole of magnet 35 resets it.

The switching contacts 69, 69a of switch 40 when driven by a push-pull signal from audio amplifier 15 provide ideal full wave or balanced demodulation, having bounce-free electrical performance superior to other electromechanical demodulators or to semiconductor demodulators. Since synchronous motor 5 drives the chopper 3 at a modulation or chopping frequency exactly one half of the frequency of power source 6, demodulator 16 is similarly driven. As a consequence, power-source-induced noise pick-up is rejected; i.e., even harmonics of the modulation frequency are rejected. In addition, phase coherence is maintained, even with temperature variation.

As is seen from FIGS. 1 and 5, the varying push-pull amplitude output of audio amplifier 15 is connected to the opposed electrode 61,61a of switch 40 via the respective leads 41 and 43. The center electrode 63 of switch 40 provides the demodulated output signal, which output signal is coupled via lead 42 to low pass filter 17 and thence to indicator 18. Because of the integrating characteristic of low pass filter 17, any unidirectional component of the demodulated output signal which corresponds to the self-noise of radiometer receiver element is, in effect beneficially cancelled. If desired, stages of direct current amplification may be inserted between filter 17 and display 18.

Phase adjustment of demodulator 16 relative to modulator or chopper 3 is readily obtained, for instance, for values up to 120° and can even be effected with slight adjustment of the apparatus, over the complete 360° range. This is a distinct contrast to electronic phase shifter circuits which have limited adjustability and exhibit, in addition, wave shape distortion problems.

Furthermore, it is seen that the inventive modulator-demodulator device reduces complexity of the radiometric receiver and affords a significant reduction in cost. Expensive reference signal generators are eliminated as well as expensive semiconductor demodulators with their attendant problems associated with off-set voltage, contact resistance, isolation, noise, and temperature stability.

While the invention has been described in its preferred embodiment, it is to be understood that the words which have been used are words of description rather than limitation and that changes within the purview of the appended claims may be made without departing from the true scope and spirit of the invention in its broader aspects.

1. In a radiometric measurement system of the type including signal modulation means cyclically and alternately connecting a signal whose amplitude is to be measured and a signal of known amplitude to receiver means, audio detector means for detecting the modulated output of said receiver means, demodulator means for operating on the output of said audio detector means for producing a rectified signal, means for displaying said rectified signal, and motor means for driving said signal modulation means and said demodulator means in synchronous relation, the improvement comprising:

longitudinally slotted wave guide means mounted in off-set relation with respect to said motor means, rotor means coupled to said motor means in co-planar relation with said slot of said slotted wave guide, said rotor means comprising an electrical noise reference element adapted to be physically and cyclically injected into and withdrawn from said slotted wave guide means for the purpose of synchronously modulating flow of electro-magnetic energy therewithin, magnetic means having opposed poles located substantially symmetrically upon said rotor means for rotation of said poles in a substantially circular locus, and switch means mounted proximate said circular locus for actuation by said magnetic poles, said motor means, said magnet means, and said switch means forming said synchronous demodulator means for operating in synchronous relation with said modulator means upon the output of said audio detector means for producing said rectified output signal.

2. Apparatus as described in claim 1 wherein said rotor means comprises:

cam shaped disc means coated on at least one surface with a material capable of absorbing and radiating high frequency energy, and means for mounting said disc means for rotation about an axis by said motor means.

3. Apparatus as described in claim 2 wherein said cam shaped disc comprises a disc of mica having a surface coated with a layer of material having a resistivity of substantially 400 ohms per square.

4. Apparatus as described in claim 2 wherein said cam shaped disc means has a periphery made up of two substantially equally angularly extensive sectors, one sector having a greater radius than the other.

5. Apparatus as described in claim 2 wherein said magnet means comprises a bar magnet mounted symmetrically on said means for mounting said disc mounting means.

6. Apparatus as described in claim 1 wherein said switch means comprises a bistable switch alternately set and reset with each passage of a pole of said magnet means.

7. Apparatus as described in claim 6 wherein said switch means comprises a single pole, double throw mercury contact switch including a magnetic-field-sensitive armature.

8. Apparatus as described in claim 1 wherein adjustable means is provided for manually adjusting the angular position of said switch means relative to said cam shaped disc when the latter is stationary.

* * * * *